US006769983B2

United States Patent
Slomiany

(10) Patent No.: US 6,769,983 B2
(45) Date of Patent: Aug. 3, 2004

(54) BONUS GAME

(75) Inventor: Scott D. Slomiany, Streamwood, IL (US)

(73) Assignee: IGT, Reno, NV (US)

( * ) Notice: Subject to any disclaimer, the term of this patent is extended or adjusted under 35 U.S.C. 154(b) by 174 days.

(21) Appl. No.: 09/798,619

(22) Filed: Mar. 1, 2001

(65) Prior Publication Data

US 2002/0165019 A1 Nov. 7, 2002

(51) Int. Cl.[7] .................................................. A63F 9/24
(52) U.S. Cl. ............................. 463/16; 463/17; 463/40; 463/42
(58) Field of Search ......................... 463/16–22, 40–42

(56) References Cited

U.S. PATENT DOCUMENTS

| | | | | |
|---|---|---|---|---|
| 5,791,991 | A | * 8/1998 | Small | 463/41 |
| 5,848,932 | A | 12/1998 | Adams | 463/20 |
| 6,033,307 | A | 3/2000 | Vancura | 463/20 |
| 6,059,289 | A | 5/2000 | Vancura | 273/143 R |
| 6,190,255 | B1 | 2/2001 | Thomas et al. | 463/20 |
| 6,311,976 | B1 | * 11/2001 | Yoseloff et al. | 273/138.2 |
| 6,346,043 | B1 | * 2/2002 | Colin et al. | 463/17 |
| 6,379,251 | B1 | * 4/2002 | Auxier et al. | 463/42 |
| 6,398,218 | B1 | 6/2002 | Vancura | 273/138.1 |
| 6,514,141 | B1 | * 2/2003 | Kaminkow et al. | 463/25 |

FOREIGN PATENT DOCUMENTS

| | | | | |
|---|---|---|---|---|
| EP | 874 337 A1 | 10/1998 | | G07F/17/32 |
| EP | 926 645 A2 | 6/1999 | | G07F/17/32 |
| EP | 945 837 A2 | 9/1999 | | G07F/17/32 |
| EP | 984 407 A2 | 3/2000 | | G07F/17/32 |
| EP | 984 408 A2 | 3/2000 | | G07F/17/32 |
| EP | 989 531 A2 | 3/2000 | | G07F/17/32 |

OTHER PUBLICATIONS

Monopoly Blackjack Edition Game, described in Mikohn brochure, 2000.
Monopoly Blackjack Edition Game, website article, http://www.mikohn.com/products/tables_games/Monopoly_Blackjack.com, Dec. 14, 2001.
Monopoly Poker Edition Games, website article, http://www.mikohn.com/products/tables_games/Monopoly_Poker.com, Dec. 14, 2001.

* cited by examiner

Primary Examiner—S. Thomas Hughes
Assistant Examiner—Carmen D. White
(74) Attorney, Agent, or Firm—Bell Boyd & Lloyd LLC

(57) ABSTRACT

A game, such as a bonus game for a gaming machine having a base game, has a plurality of different items to be selected by a player, each item having a value in an amount preset for a given bonus round, and a respective initial quantity in a preset amount. The player selects an item, such as one of many items for purchase in a store, and the value for that item is registered, along with subtraction of a unit from the quantity of that item. Provided that the quantity for that item selected is not then zero, the player continues to select another item, with registration of the value for that item and subtraction until an item is selected thereby having a zero quantity.

40 Claims, 5 Drawing Sheets

BONUS GAME

FIELD OF THE INVENTION

This invention generally relates to gaming machines, although it can conceivably have broader application to games in general, and more particularly to a novel bonus game for gaming machines.

BACKGROUND OF THE INVENTION

Slot machines, poker machines, blackjack machines and similar gaming machines are abundant. Some, such as slot machines, may be mechanical devices without any video component. Machines to play card games, as well as slot machines, are more and more based upon a video monitor as the display mechanism for the game, with the game itself governed by a microprocessor-based system.

The popularity of the games, and these gaming machines, derive from a number of factors, some of which are the apparent likelihood of winning (typically money in a wagering environment), the attractiveness of the game machine, and the basic level of entertainment provided by the game/machine. It is therefore one general driving force in the gaming industry to come up with new and exciting games and gaming machines which will attract players, entertain them, and promote repeated play.

One way that has been tried to accomplish the foregoing has been to enhance the play of a base game, where the base game may be a relatively standard-type game already established in the industry, with a bonus game. Such a bonus game can be one which is similar to the underlying game being played, or can be completely unrelated to the base game in the sense of being a game different from that being played as the base game. For instance, the bonus round could be a separate wheel which is spun in the course of play of a slots game when triggered by some event in the slots game.

In general, the bonus game will ordinarily have some increased value associated with its play, and/or a statistically higher probability of success, just to name two ways in which a heightened player appeal may be generated. A bonus game along some of the foregoing lines previously developed by the inventor hereof is disclosed in U.S. Pat. No. 6,159,098.

SUMMARY OF THE INVENTION

It is accordingly a principal objective of the present invention to provide a new game in the form of a bonus game, which in a presently preferred form is particularly adapted as a bonus game for a gaming machine. In this environment, it could be applied to a spinning reel slot machine, or a video slot machine, a video card-game machine, or any other game of chance, for that matter. Again, although the invention will be primarily described hereafter as a bonus game associated with a video gaming machine, it could readily be adapted for a live casino game at a gaming table, for instance, where the bonus game could be displayed on a video monitor as an adjunct to the gaming table.

In accordance with the foregoing principal objective, the invention takes the form in one aspect as a method of playing a bonus game associated with a gaming machine operated by a processor. The gaming machine has a base game, which can be of any known (or hitherto unknown) type.

The bonus game has a plurality of different items to be selected by a player, each item having a value in a first amount preset for a given bonus round. In a preferred embodiment, each item has a respective initial quantity ranging from one to a second amount preset for the bonus round. The bonus round is selected for operation (play) if a predetermined event occurs in the base game.

The bonus round is set up for play with the items displayed for player selection. One contemplated embodiment uses the format of a store with products to be selected by the player and placed in a depiction of a shopping cart. In this embodiment, quantity values for the items are not initially revealed to the player.

A player interface mechanism (e.g., touchscreen, mouse, keypad etc.) is provided through which the player can select a desired item. The player makes a first selection of an item through operation of the interface mechanism, and there is a registration of the value for the item of that first selection, as well as a subtraction of a unit from the quantity for that item.

The player makes another selection of an item unless the first item quantity is zero after the first selection, in which event the bonus round is over. If the quantity is not zero, however, the second selection is registered as to its value, and subtraction of a unit from the quantity for that item then occurs. This sequence continues until an item is selected having a zero quantity after subtracting a unit from the quantity for that item.

The invention has likewise found application as a gaming machine, which includes a processor having a program for operating and controlling play of a base game, and for operating and controlling play in a bonus game. Here again, the bonus game has a plurality of different items to be selected by a player, each item having a value in a first amount preset for a given bonus round, and a respective initial quantity ranging from one to a second amount preset for the bonus round. A variation of the invention also contemplates having an initial zero quantity, but this is not considered most desirable in a bonus format.

A display driven by the processor shows the items for player selection. A player interface mechanism communicating with the processor provides commands from the player for selection of a desired item. As with the method described above, the player makes a first selection of an item through operation of the interface mechanism, with a registration mechanism registering the value for that item, and subtracting a unit from the quantity for that item. Play of the bonus round continues with the player making another selection of an item unless the first item quantity is zero after the first selection, in which event the bonus round is terminated by the program. Otherwise, play of the bonus round and this gaming machine continues until a zero quantity occurs.

The operation of the bonus round can occur in the course of play of the base game immediately upon a predetermined event occurring. The base game is returned to upon conclusion of the bonus round. In a preferred form of the invention, the value for a selected item is displayed only after its initial selection.

The features, advantages and accomplishments of the invention will be further appreciated and understood upon consideration of the following detailed description of an embodiment of the invention, taken in conjunction with the drawings, in which:

DETAILED DESCRIPTION OF AN EMBODIMENT OF THE INVENTION

The bonus game in the embodiment described herein is a "shopping" game in which the player selects one or more items from a variety of goods to put in his or her shopping cart. In this particular embodiment, there are fifteen different items for the player to select from. They are denoted by the rectangles containing the letters "A" through "O" shown in FIG. 1.

Each item has coin value (its price, or credit value) and a number in "stock" (i.e., the quantity of the item that the player may select before the item is "sold out"). At the start of the bonus round, the CPU randomly sets the price and quantity in stock of each item. The programming for randomly generating these values, as well as driving the display and otherwise controlling and operating the play of the game, is readily understood by those of skill in this art.

The bonus game is initiated by some predetermined event in the base, or underlying game, which could be the achievement of a threshold score, or some random happening, such as a bonus symbol(s) appearing on a payline of a slot machine, just for one example. It may be triggered in the course of play of the base game, with a return to the base game, or at the end of the base game.

At the start of the bonus game, the player does not know any of the values assigned to quantity or coin (credit). The coin value for each item is set to one of the following values, although there are many sets of values that may be used, as is well known to those skilled in the art: 5, 10, 15, 20, 25, 30, 40, 50, 100. The number of items in stock for each item is set to a number between one and five items. This range may be modified in ways that, once again, are well known to those skilled in the art. Likewise, the credit value could be made known at the outset, although this is not presently considered to be the most advantageous presentation.

Figure 1:
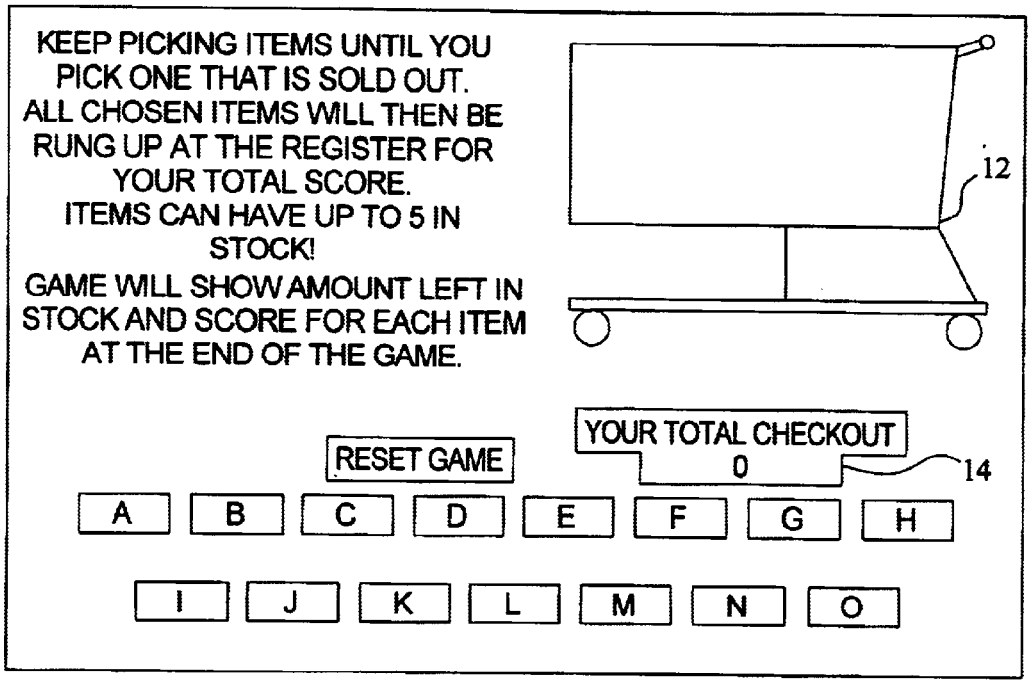
FIGS. 1 through 6 are illustrations of screens of a display at various points in the course of play of a bonus game in accordance with the teachings of the present invention.
Figure 2:
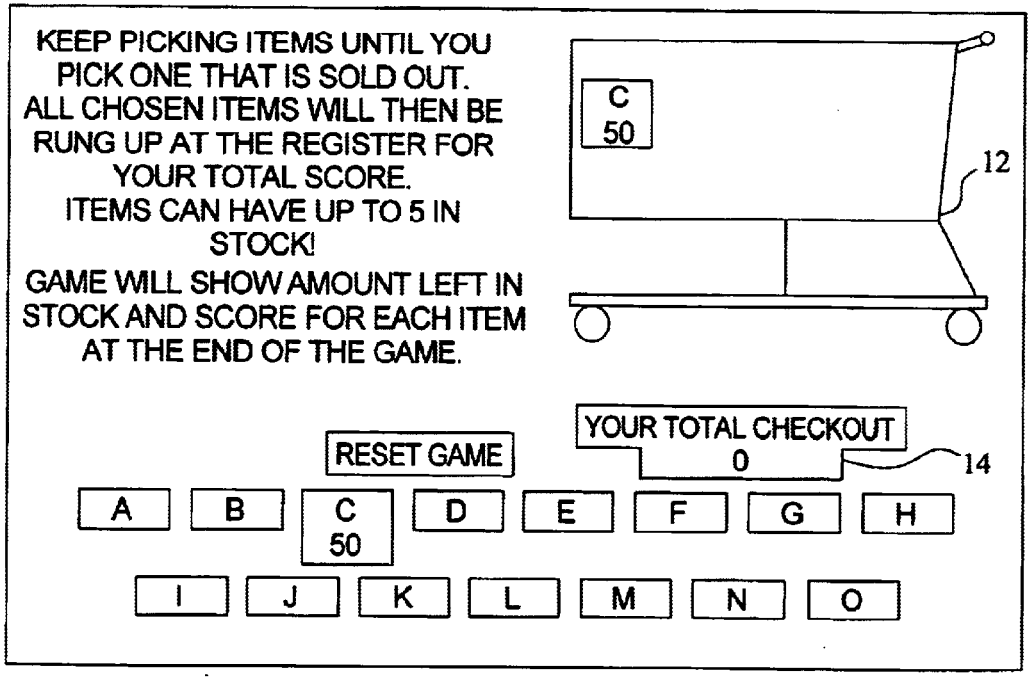

The bonus round is played by having the player select from the items A through O in FIG. 1. The player selects an item (such as from a variety of grocery products, just to name one kind of goods) by pointing at the rectangle containing the item. FIGS. 1 through 6 depict representative screens of a display monitor 10, schematically illustrated in the block diagram of FIG. 7. This is done using a mouse, touch screen or other pointing device as is well known by those skilled in the art. Once an item is selected, the coin value of that item is revealed. FIG. 2 shows the bonus game after the player has selected item "C" as the first item.

Item C is worth fifty coins. FIG. 2 shows the player's "Shopping Cart" 12 which has one item of "C" after the first pick. After the selected item is moved to the shopping cart 12, the game will show a "SOLD OUT" message if the last item of that type was selected. For instance, if the number in stock of item C was only one, then item C would be sold out (zero remaining) after the first pick, and the game would end. Since the "SOLD OUT" message did not appear in the present illustrative example of the bonus game, the player is ready to make a second pick.

Figure 3:
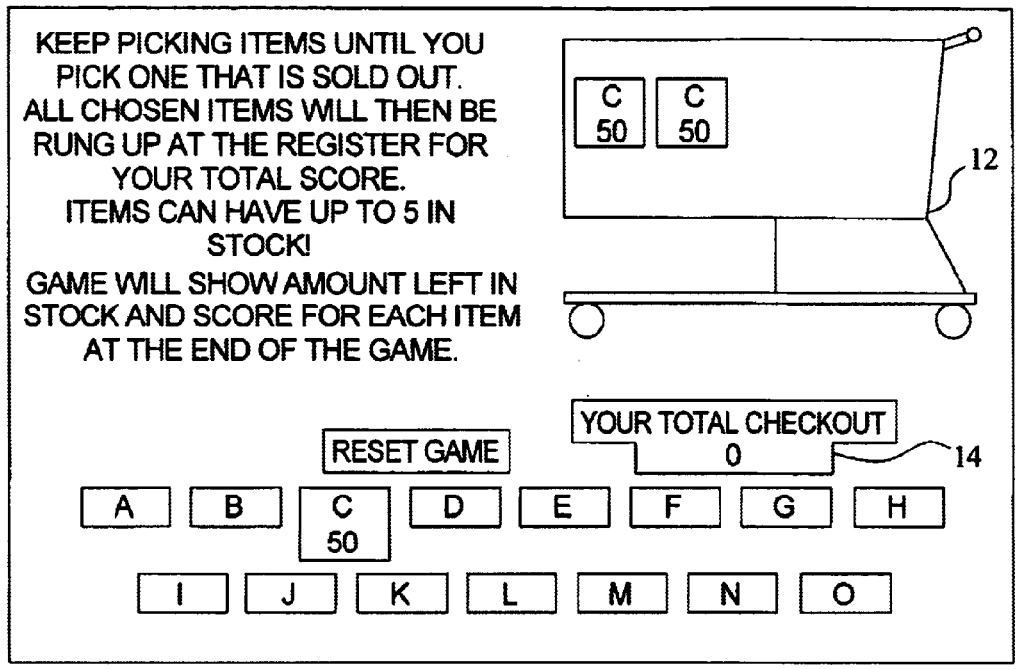

FIG. 3 shows the display after the player selects another item C. Knowing that fifty coins is a high payout for an item, the player selected item C again to receive another fifty coins. The shopping cart 12 in FIG. 3 now shows two representations of item C worth fifty coins each. If the number in stock of item C was only two at the start of the game, however, then the game would now display "SOLD OUT", and the bonus round would be over. Since this illustrative embodiment has more than two of item C, the player may continue to pick a new item, or take a chance on item C again, until the "SOLD OUT" indicator appears.

Figure 4:
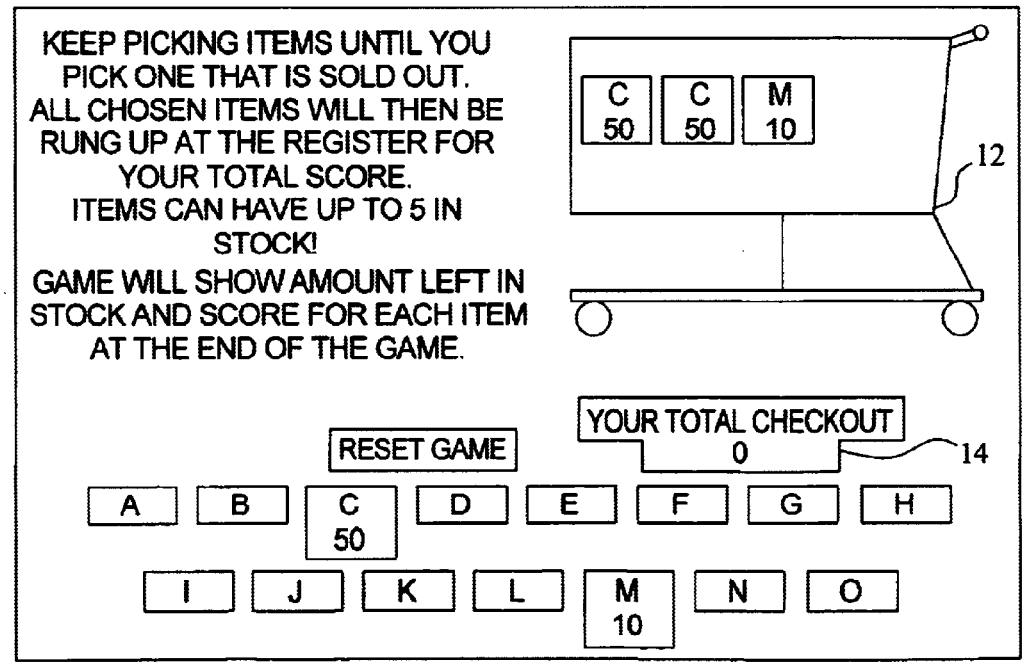

FIG. 4 shows the screen of the display 10 after the player has made the next pick, this time of item M. Item M is worth ten coins in this bonus game, and since it did not show "SOLD OUT", there must be more units of item M left; so the bonus round continues. Item M is added to the shopping cart 12.

Figure 5:
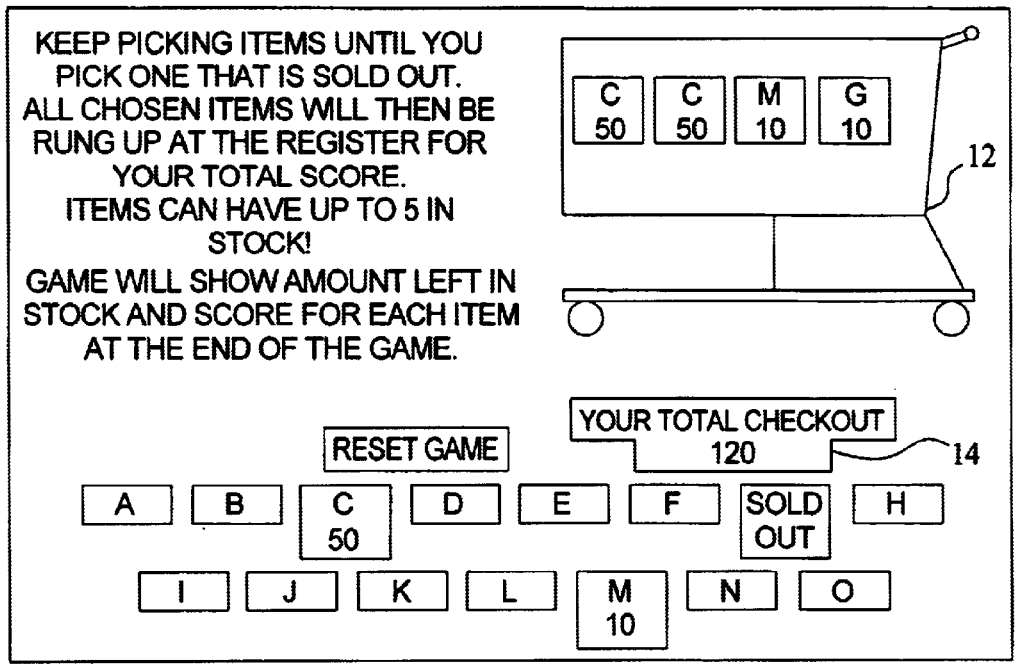

FIG. 5 shows the screen of the display 10 after the player has selected item G as the next pick. Item G turns out to be worth ten coins, and it is placed in the shopping cart 12. There was only one unit of item G available at the start of the game, however, so the selection of item G results in item G being sold out (as shown by the "SOLD OUT" indicium in FIG. 5), and thus the bonus game ends. The total of the items in the shopping cart are added up (registered), and shown to be 120 coins in the "Your Total Checkout" window 14.

Figure 6:
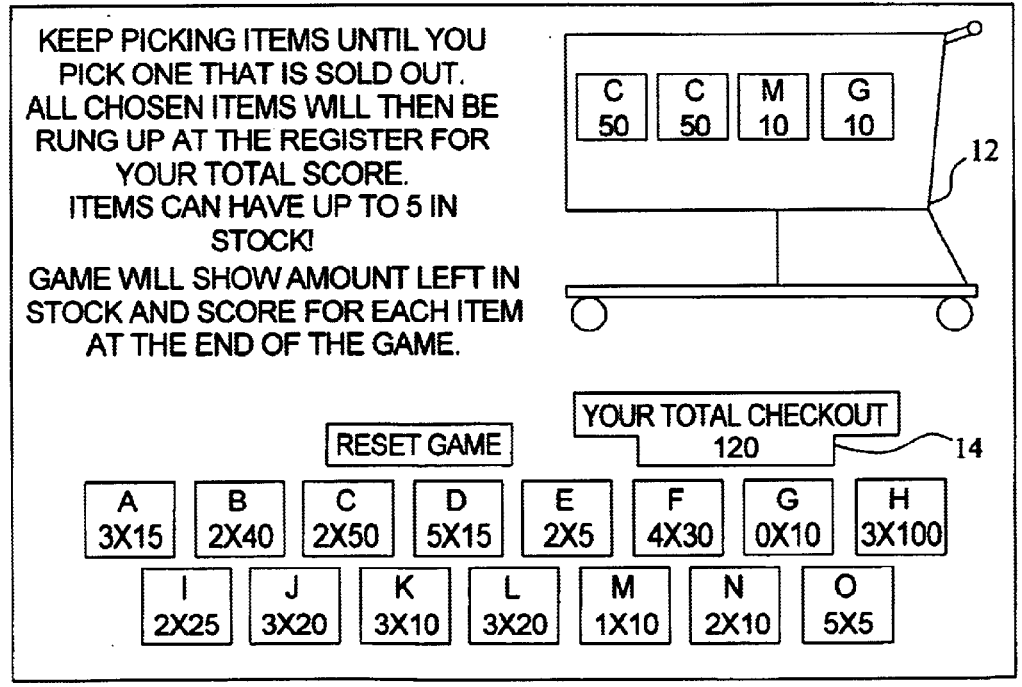
Figure 7:
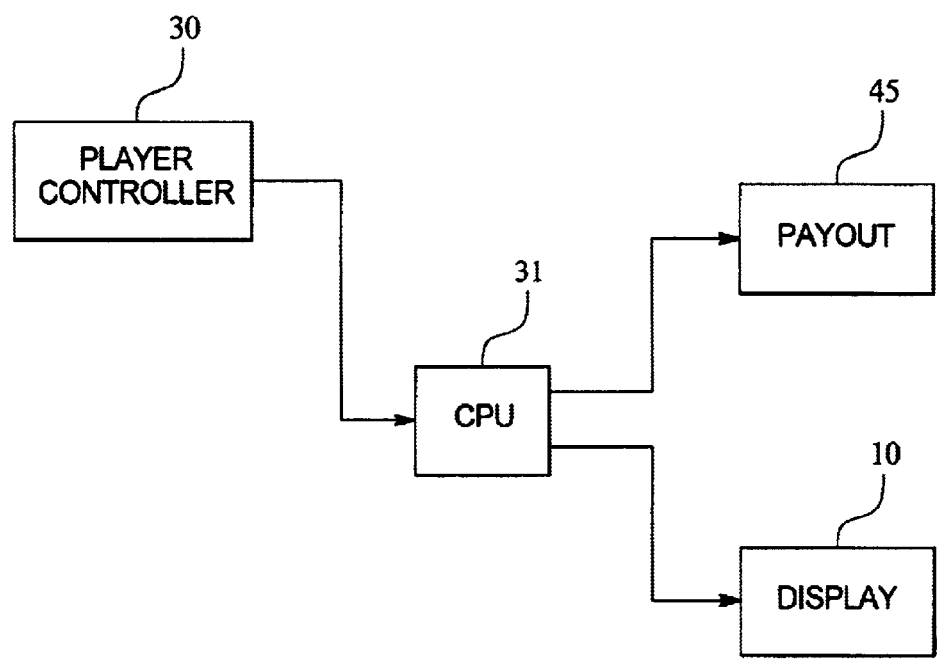
FIG. 7 is a block diagram of a control system for play of an embodiment of the present invention.

FIG. 6 shows the screen after the checkout value has been posted (window 14), now revealing to the player the value of each item and how many of each item remain in stock. This allows the player to see which items could have been chosen without ending the game. It can be seen that the player could have taken a third item C without ending the game, but would have ended the game had the player taken a second item M. Two item H's could have been acquired for 100 coins each without ending the game, for 200 more coins; if the third item H was also selected, this would have given the player 300 more coins, while ending the game but with a better final award than the ten coins for item G (which ended the game in this illustrative example). The end-of-game screen revealing the remaining quantities and values need not be provided, but this is considered to enhance the entertainment value of the bonus game, and whet the player's appetite for future play.

Figure 8:
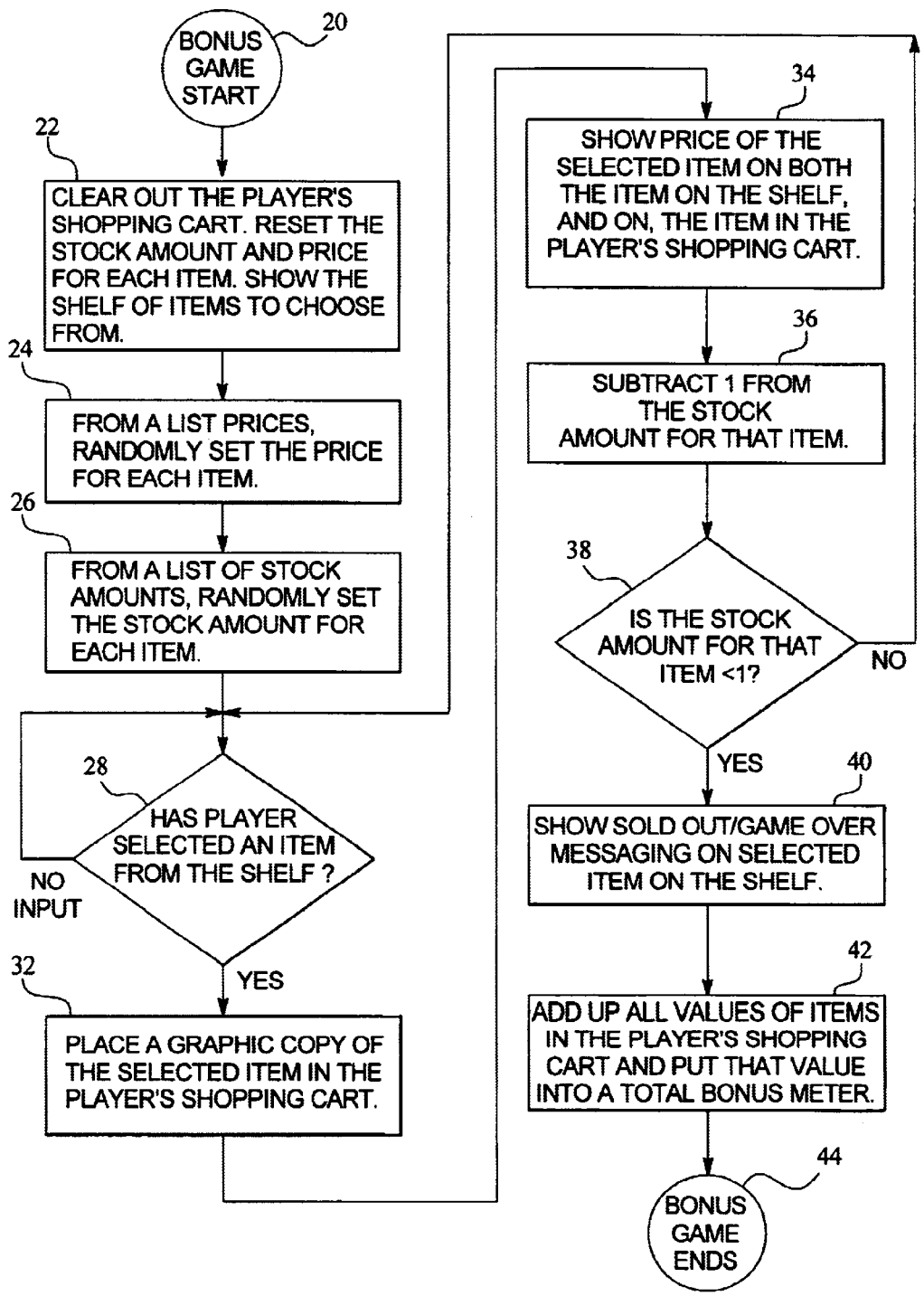
FIG. 8 is a flow diagram of control and operation of play of a bonus game as illustrated and described with respect to FIGS. 1 through 6.

A flowchart for the operation of the foregoing bonus game is shown in FIG. 8. Referring to that FIG. 8 in conjunction with FIG. 7, the bonus game is triggered at step 20. The programming of the CPU sets up the display (video monitor 10) of the empty shopping cart 12, and the shelf of items A through O, along with incidental instructions, windows (e.g., 14) graphics, music, lights and the like, clearing any previous display and values/quantities for the bonus round, all as indicated at step 22. A predetermined list of prices is provided in the program, and these are then randomly assigned for each item (step 24), as are the quantities for each item, also being randomly assigned from a predetermined list of quantities (step 26).

The player now chooses an item at step 28, through input via any number of commonly used interface mechanisms 30 to indicate a player command signal to the CPU 31. That item is then depicted in the shopping cart 12 (step 32), along with registration and display of the "Price" (coins, value, credit, etc.) both in the cart and below the item on the shelf (step 34). The program subtracts a unit from the quantity ("stock amount") for that item (step 36), and if the quantity is not zero after subtraction (step 38), the bonus game continues through a return to step 28. If the quantity is zero, however, then the "SOLD OUT" indicium is displayed, and a game-over sequence commences (step 40). The values of all of the items in the cart 12 are added, and the total is displayed in the "Your Total Checkout" meter window 14 (step 42). The bonus game is thereupon concluded (step 44), with a return to the point of play of the base game where the bonus round was triggered or the start of a new base game (if the bonus round occurs at the end of the base game, rather than in the course of play of the underlying game). A payout, provided through one of many well known mechanisms 45, may occur upon completion of the bonus round, or that total value earned in the bonus round may be added as a credit to the base game, just to name two options.

The video display 10 may comprise a CRT, LED, dot matrix or any other commonly known display device. The CPU is also of a common and well known variety selected as desired, and would of course include memory, software, operational instructions and data associated with both the underlying game and the bonus game.

It is worth noting that a program for the foregoing embodiment uses a list of fifteen credit values (for the "cost") of the items, and shuffles them randomly to assign them to the items at the start of each game. Table 1 below shows the fifteen values used by this illustrative example:

TABLE 1

| 5 |
|---|
| 5 |
| 10 |
| 10 |
| 10 |
| 10 |
| 15 |
| 15 |
| 20 |
| 20 |
| 25 |
| 30 |
| 40 |
| 50 |
| 100 |

There is a list of fifteen numbers used to set the number in stock (quantity) of each item. The program randomly shuffles the fifteen quantity numbers and randomly assigns them to the items. Table 2 shows the "in stock" numbers used herein:

TABLE 2

| 1 |
|---|
| 2 |
| 2 |
| 2 |
| 2 |
| 2 |
| 3 |
| 3 |
| 3 |
| 3 |
| 3 |
| 4 |
| 4 |
| 5 |
| 5 |

This version of the bonus game has an "optimal play" aspect when trying to determine the expected value (EV) of the bonus round. Once the player sees some of the values, and having knowledge of previous play of the game, the player can then estimate the coin value as well as likely quantity of known (selected) items, and the expected value of making a pick from the unknown (not yet selected) items. The optimal play at any point is the choice with the highest expected value. It is considered that optimal play for this version may well be to continue to select items with higher coin values, such as 50 and 100 coins, even at the risk that the bonus round may thereby end sooner rather than later.

Given this model of scrambling the values of Table 1 and Table 2, it is these values that would get adjusted to raise or lower the expected value. There are other ways in which the coin values and in stock quantities could be set at the start of a game, including the use of one of many random tables that define each credit value and quantity explicitly.

A variation of the bonus game described above could have the initial quantity of some of the items set at zero, that is, there would be no credit awarded if such an item was initially selected and the bonus game would be over. This is not considered to be the most advantageous presentation of the bonus game, however, since achieving some "success" during the round enhances the attractiveness of play.

The value of the bonus game could also be linked to a wager placed upon the underlying, or base, game. For example, with the bonus game associated with a video slot game, the bonus game value may be set as a function of three "drums" or like indicia being achieved, with an expected value of 50 times the line bet in the bonus game for example; four "drums" would establish the bonus game with an expected value of 150 times the line bet; and five "drums" would start the bonus such that it had an expected value of 1000 times the line bet. Using the store embodiment described above, the expected value would be modified by using different tables for the item cost and for the stock amount of each item. There would be one set of tables for an EV of 50, a second set of tables for an EV of 150 and a third set of tables for an EV of 1000. If the player has bet more than one coin per line, then each item cost will be multiplied by the amount bet on the line.

Thus, while the present invention has been described with respect to a particular embodiment, those possessing skill in the art will recognize modification, substitutions, changes, adaptations and the like that may be made thereto without departing from the spirit and scope of the invention, and such variations are considered to fall within the ambit of the invention, as is intended to be set forth in the following claims.

What is claimed is:

1. A method of playing a bonus game associated with a gaming machine operated by a processor, the gaming machine having a base game, comprising the steps of:

providing a bonus game having a plurality of different items to be selected by a player, each of said items having a credit in a first amount preset for a given bonus round, and each of said items having a respective initial quantity ranging from one to a second amount preset for said bonus round, wherein a plurality of said items have an initial quantity greater than one;

selecting operation of the bonus game if a predetermined event occurs in the base game;

setting up a bonus round for play with said plurality of different items displayed for player selection, wherein said quantities for said items are not initially revealed to the player;

providing a player interface mechanism through which the player can select at least one of said items;

enabling the player to make a first selection of one of said items through operation of said interface mechanism;

registering said credit for said first selected item, and subtracting a unit from said quantity for that selected item;

enabling the player to make another selection of one of said items including any previously selected item unless said first item quantity is zero after said first selection, in which event the bonus round is over;

registering said credit for said item of said another selection, and subtracting a unit from said quantity for that item; and enabling the player to continue to select said items including any previously selected item and registering said credit for each of said selected items until one of said items is selected having a zero quantity after subtracting a unit from said quantity for that selected item.

2. The method of claim 1 wherein said credits are all non-zero and positive amounts.

3. The method of claim 1 wherein said items are displayed as consumer products for purchase.

4. The method of claim 1 wherein said credit for a selected item is displayed only after its initial selection.

5. The method of claim 1 wherein said credit and quantities are randomly assigned to said items for a given bonus round.

6. The method of claim 5 wherein said bonus game operation is selected and said bonus round is set up at the end of play of the base game.

7. The method of claim 6 wherein any credits registered are provided to the player in a payout upon completion of said bonus round.

8. A method of playing a bonus game associated with a gaming machine operated by a processor, the gaming machine having a base game, comprising the steps of:

providing a bonus game having a plurality of different items to be selected by a player, each said item having a value in an amount preset for a given bonus round, and each of said items having a respective initial quantity in an amount preset for said bonus round wherein a plurality of said items have an initial quantity greater than one;

selecting operation of the bonus game if a predetermined event occurs in the base game;

setting up a bonus round for play with said items displayed for player selection, wherein said quantities for said items are not initially revealed to the player;

providing a player interface mechanism through which the player can select at least one of said items;

enabling the player to select one of said items through operation of said interface mechanism;

registering said value for said selected item, and subtracting a unit from said quantity of said selected item, provided said quantity for said selected item is not zero; and enabling the player to continue to select said items including any previously selected item and registering said value for each selected item until an item is selected having a zero quantity.

9. The method of claim 8 wherein said quantities range from zero to a predetermined positive amount.

10. The method of claim 8 wherein said items are displayed as consumer products for purchase.

11. The method of claim 8 wherein said quantities are all non-zero and positive amounts.

12. The method of claim 11 wherein said values for each item are greater than zero.

13. The method of claim 12 wherein said items are displayed as consumer products for purchase.

14. The method of claim 8 wherein said values and quantities are randomly assigned to said items for a given bonus round.

15. The method of claim 14 wherein said bonus game operation is selected and said bonus round is set up in the course of play of the base game immediately upon said predetermined event occurring, and the base game is returned to upon conclusion of said bonus round.

16. The method of claim 8 wherein a value for a selected item is displayed only after its initial selection.

17. The method of claim 16 wherein any values registered are provided to the player in a payout upon completion of said bonus round, and said bonus game operation is selected and said bonus round is set up at the end of play of the base game.

18. A gaming machine comprising:

a base game;

a bonus game having a plurality of different items to be selected by a player, each of said items having a value in a first amount preset for a given bonus round, and each of said items having a respective initial quantity ranging from one to a second amount preset for said bonus round, wherein a plurality of said items have an initial quantity greater than one;

a display upon which said items are displayed for player selection wherein said quantities for said items are not initially revealed to the player;

a player interface mechanism through which the player can select at least one of said items;

a registration mechanism;

a processor operable with said display, said player interface mechanism and said registration mechanism to:
operate and control play of the base game;
operate and control play in the bonus game; and
if a predetermined event occurs in the base game;
enable the player to make a first selection of one of said items;
register said value for said first selected item, and subtract a unit from said quantity for that selected item;
enable the player to make one other selection of one of said items including any previously selected item, unless the quantity of said first selected item is zero after said first selection, in which event the bonus round is terminated by said program;
register said value for said other selected item, and subtract a unit from said quantity for that item; and
enable the player to continue to select said items including any previously selected item and register said value for each of said selected items until one of said selected items has a quantity of zero after subtracting a unit from said quantity for that item.

19. The gaming machine of claim 18 wherein said values are predetermined positive amounts.

20. The gaming machine of claim 18 wherein said predetermined event causes said bonus round to be set up at the end of the base game.

21. The gaming machine of claim 18 wherein a value is revealed to the player only after selection of its item.

22. The gaming machine of claim 18 wherein said values and quantities are randomly assigned to said items for a given bonus round.

23. The gaming machine of claim 22 wherein said bonus game operation is selected and said bonus round is set up in the course of play of the base game immediately upon said predetermined event occurring, and the base game is returned to upon conclusion of said bonus round.

24. The gaming machine of claim 18 wherein said items are displayed as consumer products for purchase.

25. The gaming machine of claim 24 wherein a value is revealed to the player only after selection of its item.

26. The gaming machine of claim 24 wherein said items are displayed in a shopping cart after selection.

27. The gaming machine of claim 26 wherein any values registered are provided to the player in a payout upon completion of said bonus round.

28. A bonus game for a gaming machine having a base game, comprising:
   a plurality of different items to be selected by a player, each of said items having a value in an amount preset for a given bonus round, and each of said items having a respective initial quantity in an amount preset for said bonus round, wherein a plurality of said items have an initial quantity greater than one;
   a display device;
   a processor operable with said display device, after a predetermined event occurs in the base game, to:
      display said items for player selection, wherein said quantity for each of said items is not initially revealed to the player;
      provide a player interface mechanism through which the player can select at least one of said items, wherein the player selects each of said items through operation of said interface mechanism;
      register said value for said selected item, and subtract a unit from said quantity of said selected item, if said quantity for the selected item is not zero; and
      enable the player to continue to select said items including any previously selected item and register said value for each selected item until one of said selected items has a quantity of zero.

29. The game of claim 28 wherein said values and quantities are randomly assigned to said items for a given bonus round.

30. The game of claim 28 wherein a value for a selected item is displayed only after its initial selection.

31. The game of claim 28 wherein said items are displayed as consumer products for purchase.

32. The game of claim 28 wherein said values for each item are greater than zero.

33. The game of claim 32 wherein said quantities are all non-zero and positive amounts.

34. A bonus game for a gaming machine having a base game, comprising:
   a plurality of different items to be selected by a player, wherein each of said items has a value in an amount preset for a given bonus round, and each of said items has a respective initial quantity in an amount preset for said bonus round, wherein said values and quantities are randomly assigned to said items for a given bonus round, said quantities for each of said items is initially greater than zero and said quantities for a plurality of said items is initially greater than one;
   a display device;
   a processor operable with said display device, after a predetermined event occurs in the base game, to:
      display said items as consumer products for purchase by player selection, wherein said quantity for each of said items in not initially revealed to the player;
      provide a player interface mechanism through which the player can select at least one of said items, wherein the player selects one of said items through operation of said interface mechanism;
      register said value for each of said selected items, and subtract a unit from said quantity of said selected item, provided said quantity for said selected item is not zero; and
      enable the player to continue to select items, including any previously selected item and register said value for each of said selected items until one of said selected items has a zero quantity.

35. The bonus game of claim 34 wherein said bonus game operation is selected and said bonus round is set up at the end of play of the base game.

36. The bonus game of claim 34 wherein a value for a selected item is displayed only after its initial selection.

37. The bonus game of claim 36 wherein any credits registered are provided to the player in a payout upon completion of said bonus round.

38. The bonus game of claim 37 wherein said bonus round is over when said quantity is zero after an item is selected and said subtraction has occurred.

39. A gaming device comprising:
   a plurality of awards;
   a plurality of different items, wherein each of said items is associated with one of said awards and each of said items is associated with an initial quantity, wherein a plurality of said items are each associated with an initial quantity greater than one;
   a display device; and
   a processor operable with said display device to:
      (a) enable a player to select one of said plurality of items;
      (b) reveal the award associated with said selected item;
      (c) provide the revealed award to the player;
      (d) reduce the quantity associated with said selected item by one; and
      (e) repeat steps (a) to (d) until the quantity associated with one of said items is zero, wherein in each iteration of (a) to (d) the player is enabled to reselect one of said items which was previously selected by the player.

40. A method of operating a gaming device, said method comprising:
   (a) enabling a player to select one of a plurality of different items, wherein each of said items is associated with one of a plurality of awards and each of said items is associated with an initial quantity, wherein a plurality of said items are each associated with an initial quantity greater than one;
   (b) revealing the award associated with said selected item;
   (c) providing the revealed award to the player;
   (d) reducing the quantity associated with said selected item by one; and
   (e) repeating steps (a) to (d) until the quantity associated with one of said items is zero, wherein in each iteration of (a) to (d) the player is enabled to reselect one of said items which was previously selected by the player.

* * * * *

UNITED STATES PATENT AND TRADEMARK OFFICE
CERTIFICATE OF CORRECTION

PATENT NO. : 6,769,983 B2
DATED : August 3, 2004
INVENTOR(S) : Scott D. Slomiany It is certified that error appears in the above-identified patent and that said Letters Patent is hereby corrected as shown below:

Column 4,
Line 39, change the word "whet" to -- wet --.

Column 7,
Line 32, change "each said item" to -- each of said item --.

Column 8,
Line 37, change "subtract" to -- subtracts --.

Signed and Sealed this

Twenty-eighth Day of December, 2004

JON W. DUDAS
*Director of the United States Patent and Trademark Office*